United States Patent [19]

Dougherty et al.

[11] Patent Number: 5,360,882
[45] Date of Patent: Nov. 1, 1994

[54] EUTECTIC COMPOSITIONS OF DIVINYL IMIDAZOLIDONE AND VINYL CAPROLACTAM

[75] Inventors: James A. Dougherty, Pequannock; Donald J. Shugard, Berkeley Heights; Lowell R. Anderson, Morristown, all of N.J.

[73] Assignee: ISP Investments Inc., Wilmington, Del.

[21] Appl. No.: 192,079

[22] Filed: Feb. 4, 1994

[51] Int. Cl.⁵ .............................................. C08F 22/40
[52] U.S. Cl. ...................................................... 526/262
[58] Field of Search ........................................... 526/262

[56] References Cited

U.S. PATENT DOCUMENTS

| | | |
|---|---|---|
| 3,269,969 | 8/1966 | Fikentscher et al. . |
| 3,323,986 | 6/1967 | Poschmann et al. . |
| 3,933,766 | 1/1976 | Hofmann et al. . |
| 4,205,139 | 5/1980 | Barzynski et al. . |
| 4,424,314 | 1/1984 | Barzynski et al. . |
| 4,436,887 | 3/1984 | Chromecek et al. ............... 526/262 |
| 4,440,919 | 4/1984 | Chromecek et al. ............... 526/262 |
| 4,730,045 | 3/1988 | Sekmakas et al. .................. 526/262 |
| 5,037,923 | 8/1991 | Arpin ................................... 526/262 |
| 5,094,867 | 3/1992 | Detering et al. . |
| 5,100,673 | 3/1992 | Bader et al. . |

Primary Examiner—Joseph L. Schofer
Assistant Examiner—N. Sarofim
Attorney, Agent, or Firm—Walter Katz; Marilyn J. Maue; Joshua J. Ward

[57] ABSTRACT

Eutectic compositions of vinyl caprolactam (VCL) and divinyl imidazolidone (DVI) which are liquids at room temperature are described. These compositions are useful as reactive diluents in curable coating formulations.

6 Claims, 1 Drawing Sheet

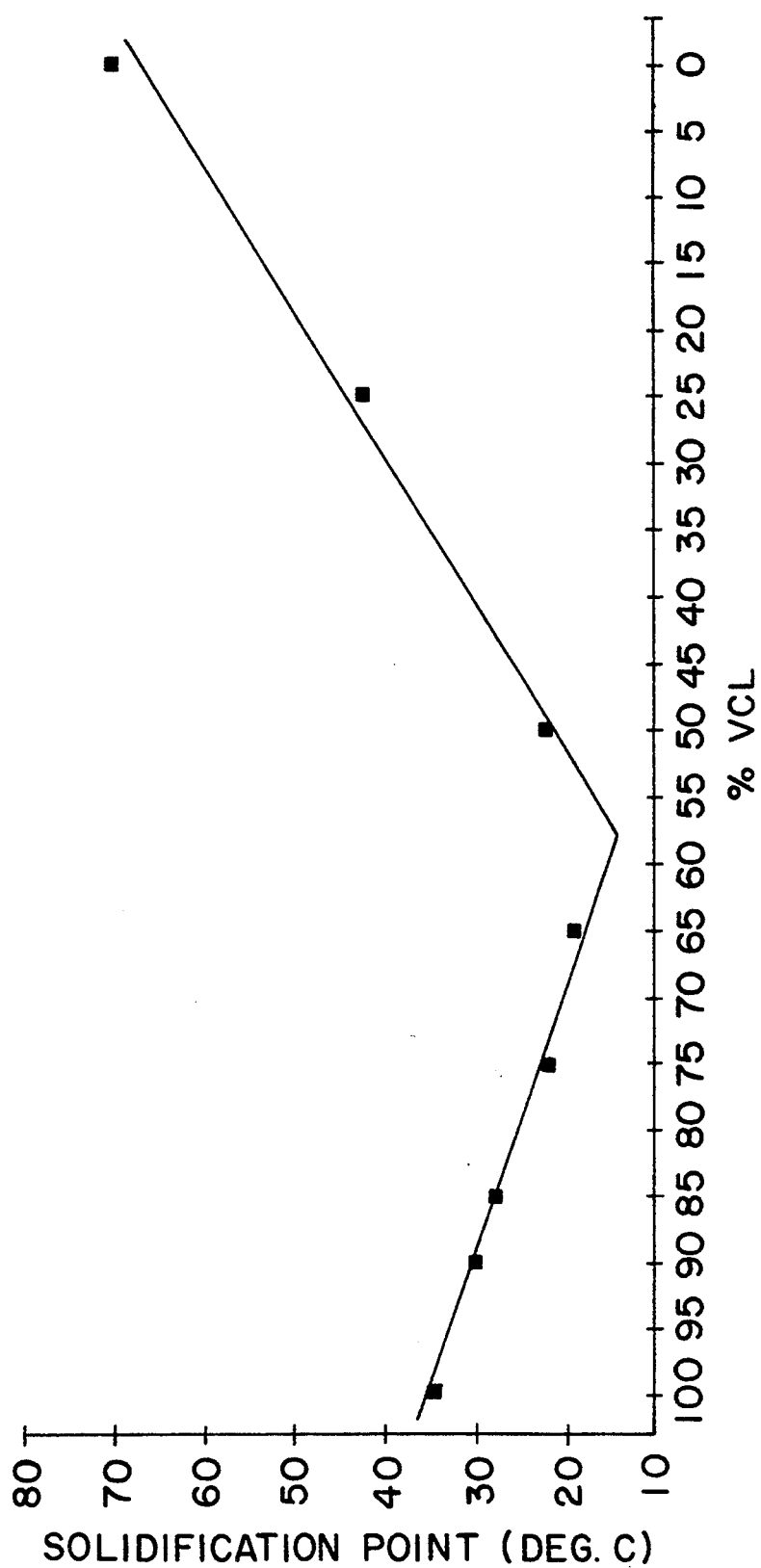

EUTECTIC COMPOSITIONS OF DIVINYL IMIDAZOLIDONE AND VINYL CAPROLACTAM

BACKGROUND OF THE INVENTION

1. Field of the Invention

This invention relates to reactive diluents for curable coating formulations, and, more particularly, to eutectic compositions of divinyl imidazolidone (DVI) and vinyl caprolactam (VCL) which are liquid at room temperature for use in such formulations.

2. Description of the Prior Art

DVI is a crystalline solid, difunctional monomer (m.p. 69°–70° C.), which is an effective reactive diluent in curable coating compositions (see U.S. Pat. Nos. 4,205,139 and 4,424,314). VCL is a monofunctional reactive diluent which also is a crystalline solid (m.p. 35° C.) at room temperature. Both of these solid materials, however, are difficult to handle as compared to liquid reactive diluents. Accordingly, it is desired to provide these materials in liquid form for use in formulating curable coating compositions.

SUMMARY OF THE INVENTION

Eutectic compositions of DVI and VCL are described herein which are liquids at room temperatures including a 10–60% DVI to 90–40% VCL composition, by weight, which has a solidification point below 30° C. A 30–50% DVI to 70–50% VCL eutectic is a liquid below 20° C. A eutectic of about 45% DVI to 55% VCL is a liquid below 15° C. These liquid eutectic compositions are advantageous in preparing curable coating compositions because they can be handled more easily than solid monomer materials.

DESCRIPTION OF THE DRAWING

The FIGURE is a graph of solidification point (S.P.) in °C., vs. percent by weight VCL for the complete percentage range of VCL–DVI binary compositions.

DETAILED DESCRIPTION OF THE INVENTION

Referring now to the FIGURE, there is shown a graph of solidification point S.P., in °C., vs. percent by weight VCL for the complete range of VCL–DVI binary compositions. The graphic representation demonstrates that a eutectic composition of 10–60% DVI to 90–40% VCL is a liquid below 30° C.; a 30–50% DVI to 70–50% VCL eutectic is a liquid below 20° C.; and a 45% DVI to 55% VCL eutectic is a liquid below 15° C. As liquids, these eutectic compositions can be handled more conveniently than the individual compounds, or mixtures of these compounds, which are solids, as reactive diluents in curable coating compositions.

The eutectic compositions of the invention are prepared by blending the individual VCL and DVI compounds in a predetermined weight ratio, at 70° C., supercooling the liquid to a temperature of about 5° C. below the expected solidification point, and seeding the supercooled liquid with a crystal of VCL to initiate freezing. The maximum temperature reached during solidification is taken as the solidification point of the composition.

The liquid eutectic compositions of the invention thus prepared were used as reactive diluents in curable coating formulations, and compared to the individual VCL and DVI as follows:

EXAMPLE 1

Vinyl caprolactam (VCL), divinyl imidazolidone (DVI), and a 60/40 VCL/DVI blend were compared as reactive diluents in the following UV curable coating formulation for floor tiles.

The components were charged into an amber bottle and mixed at room temperature until homogeneous. The formulation viscosity was measured at 25° C. Coatings were cast onto a suitable substrate (1 mil coating thickness) using a #12 Mayer bar and cured by UV exposure. The coating properties were determined immediately after UV exposure using standardized test methods. The results are summarized below:

TABLE 1

| COMPOSITION | A | B | C |
|---|---|---|---|
| Urethane Acrylate Oligomer | 48.0 | 48.0 | 48.0 |
| VCL | 10.0 | — | — |
| DVI | — | 10.0 | — |
| VCL/DVI:60/40 Eutectic | — | — | 10.0 |
| Trimethylolpropane triacrylate | 22.0 | 22.0 | 22.0 |
| Tripropyleneglycol diacrylate | 15.0 | 15.0 | 15.0 |
| 1-Hydroxy cyclohexyl- phenyl ketone | 5.0 | 5.0 | 5.0 |
| Viscosity (cps) | 1580 | 1650 | 1620 |
| CURED FILM PROPERTIES | | | |
| Maximum Conveyor Speed (fpm) | 250 | 550 | 500 |
| Hardness | H | H | H |
| % Adhesion to Polyester | 100 | 100 | 100 |
| % Adhesion to Vinyl | 100 | 100 | 100 |
| Double MEK Rubs | >100 | >100 | >100 |
| Stain Resistance[1] | | | |
| Shoe Polish | 1 | 1 | 1 |
| Mustard | 3 | 3 | 3 |
| Iodine | 4 | 4 | 4 |

[1]ASTM D-1308, 16 hrs. at room temperature
0 = no attack, 5 = severe attack

EXAMPLE 2

Example 1 was repeated using the following abrasion resistant coating formulations. Thin films (0.5 mil) were cast on a polyester substrate and cured as described above.

TABLE 2

| COMPOSITION | D | E | F |
|---|---|---|---|
| Pentaerythritol Tetraacrylate | 80.0 | 80.0 | 80.0 |
| VCL | 20.0 | — | — |
| DVI | — | 20.0 | — |
| VCL/DVI:60/40 Eutectic | — | — | 20.0 |
| 1-Hydroxy cyclohexyl- phenyl ketone | 3.0 | 3.0 | 3.0 |
| Viscosity (cps) | 180 | 205 | 195 |
| CURED FILM PROPERTIES | | | |
| Maximum Conveyor Speed (fpm) | 100 | 700 | 500 |
| Hardness | 5H | 5H | 5H |
| % Adhesion to Polyester | 100 | 100 | 100 |
| Double MEK Rubs | >200 | >200 | >200 |

The results show the efficacy of the eutectic composition of the invention as compared to the individual compounds.

While the invention has been described with particular reference to certain embodiments thereof, it will be understood that changes and modifications may be made which are within the skill of the art. Accordingly, it is intended to be bound only by the following claims, in which:

What is claimed is:

1. A eutectic composition which is a liquid below 30° C. consisting essentially of 10–60% by weight divinyl imidazolidone and 90–40% by weight vinyl caprolactam.

2. A eutectic composition which is a liquid below 20° C. consisting essentially of 30–50% by weight divinyl imidazolidone and 70–50% by weight vinyl caprolactam.

3. A eutectic composition which is a liquid below 15° C. consisting essentially of about 45% by weight divinyl imidazolidone and about 55% by weight vinyl caprolactam.

4. A curable coating formulation which includes the eutectic composition of claim 1.

5. A curable coating formulation which includes the eutectic composition of claim 2.

6. A curable coating formulation which includes the eutectic composition of claim 3.

* * * * *